US011511533B2

(12) United States Patent
Takahashi et al.

(10) Patent No.: US 11,511,533 B2
(45) Date of Patent: Nov. 29, 2022

(54) SHAPED OBJECT PRODUCTION METHOD AND EXPANSION DEVICE

(71) Applicant: CASIO COMPUTER CO., LTD., Tokyo (JP)

(72) Inventors: Hideki Takahashi, Ome (JP); Satoshi Kurosawa, Tokyo (JP); Toshihiro Ogawa, Hino (JP)

(73) Assignee: CASIO COMPUTER CO., LTD., Tokyo (JP)

(*) Notice: Subject to any disclaimer, the term of this patent is extended or adjusted under 35 U.S.C. 154(b) by 182 days.

(21) Appl. No.: 16/804,222

(22) Filed: Feb. 28, 2020

(65) Prior Publication Data

US 2020/0298546 A1 Sep. 24, 2020

(30) Foreign Application Priority Data

Mar. 20, 2019 (JP) .............................. JP2019-052240

(51) Int. Cl.
*B32B 38/00* (2006.01)
*B32B 27/08* (2006.01)

(52) U.S. Cl.
CPC .......... *B32B 38/0008* (2013.01); *B32B 27/08* (2013.01); *B32B 2038/0088* (2013.01); *B32B 2307/30* (2013.01)

(58) Field of Classification Search
CPC ................ B32B 38/0008; B32B 27/08; B32B 2038/0088; B32B 2307/30;
(Continued)

(56) References Cited

U.S. PATENT DOCUMENTS

2006/0210785 A1* 9/2006 Takada ........................ C08J 9/26
428/304.4
2017/0334214 A1* 11/2017 Ushigome ................ B41M 3/06
2018/0056693 A1* 3/2018 Kimura ............... B29C 35/0805

FOREIGN PATENT DOCUMENTS

CN     202263702 U  *  6/2012
JP     S56-5651 B2     2/1981
(Continued)

OTHER PUBLICATIONS

CN202263702U Machine Translation of Description (Google/EPO) (Year: 2021).*
(Continued)

*Primary Examiner* — Cynthia L Schaller
(74) *Attorney, Agent, or Firm* — Scully Scott Murphy & Presser

(57) ABSTRACT

A method of producing a shaped object includes preparing a formation sheet that includes a base and a thermally expansive layer that is laminated on a first main surface of the base, the thermally expansive layer containing a binder and a thermal expansion material; laminating, onto a second main surface on a side opposite to the first main surface of the base or onto the thermally expansive layer, a thermal conversion layer in predetermined pattern, the thermal conversion layer converting first electromagnetic waves into heat; and causing the thermally expansive layer to expand in a pattern that corresponds to the predetermined pattern by irradiating the formation sheet on which the thermal conversion layer is laminated with the first electromagnetic waves and second electromagnetic waves that cause the binder to become cross-linked.

7 Claims, 9 Drawing Sheets

(58) Field of Classification Search
CPC .... B32B 2310/0825; B32B 2310/0831; B32B 37/18; B32B 2037/1215; B29C 2035/0822; B29C 2035/0827; B29C 35/0805; B29C 44/022; B29C 44/14; B29C 44/3415
See application file for complete search history.

(56) References Cited

FOREIGN PATENT DOCUMENTS

| | | |
|---|---|---|
| JP | S64-028660 A | 1/1989 |
| JP | 2005-089959 A | 4/2005 |
| JP | 2012-167423 A | 9/2012 |
| JP | 2012230145 A | 11/2012 |
| JP | 2018-089839 A | 6/2018 |

OTHER PUBLICATIONS

Notice of Reasons for Refusal dated Aug. 24, 2021 received in Japanese Patent Application No. JP 2019-052240 together with an English language translation.
Notice of Reasons for Refusal dated Apr. 27, 2021 received in Japanese Patent Application No. JP 2019-052240 together with an English language translation.

\* cited by examiner

FIRST ELECTROMAGNETIC WAVES AND
SECOND ELECTROMAGNETIC WAVES

FIRST ELECTROMAGNETIC WAVES

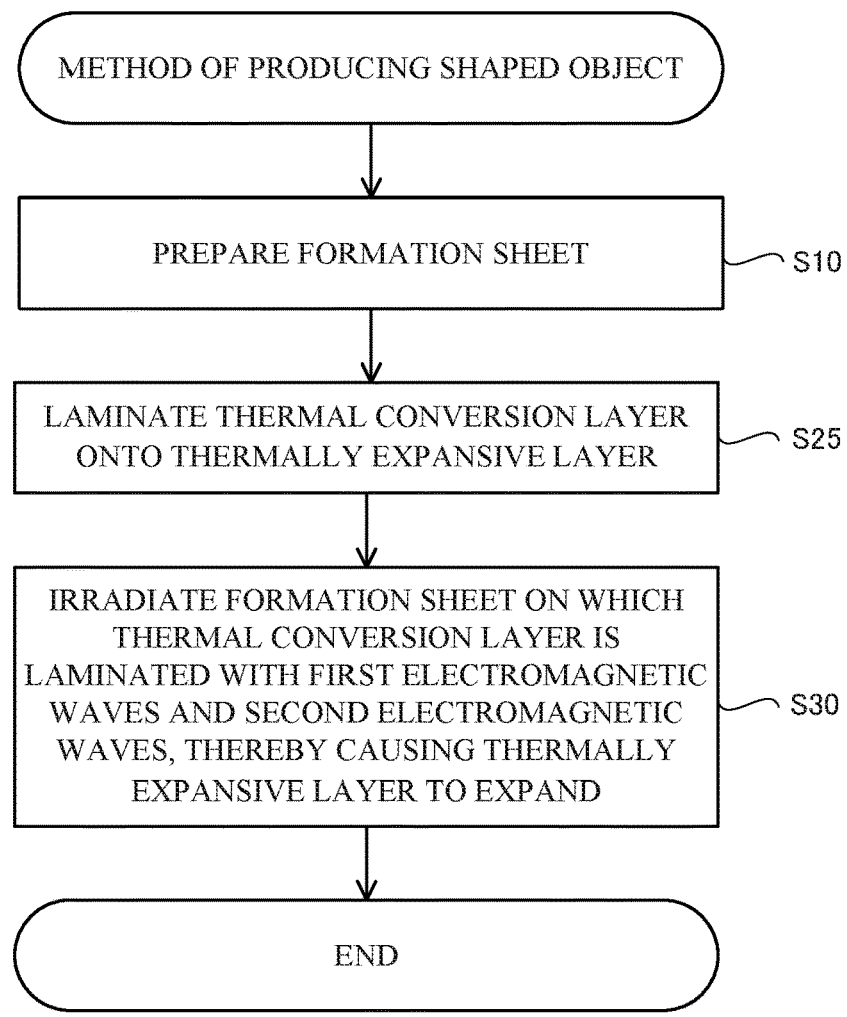
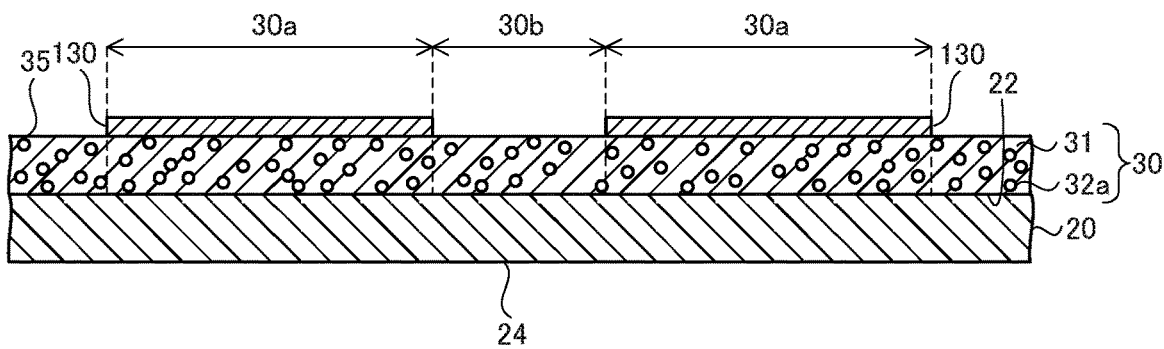

FIRST ELECTROMAGNETIC WAVES AND
SECOND ELECTROMAGNETIC WAVES

MOVEMENT DIRECTION

FIRST ELECTROMAGNETIC WAVES AND
SECOND ELECTROMAGNETIC WAVES

SHAPED OBJECT PRODUCTION METHOD AND EXPANSION DEVICE

CROSS-REFERENCE TO RELATED APPLICATION

This application claims the benefit of Japanese Patent Application No. 2019-052240, filed on Mar. 20, 2019, the entire disclosure of which is incorporated by reference herein.

FIELD

This application relates generally a shaped object production method and an expansion device.

BACKGROUND

Technology is known that forms a three-dimensional image by irradiating with light a thermally expandable sheet that has a base sheet and a coating layer including thermally expandable mirocospheres, a predetermined image being formed of an image-forming material having excellent light absorption characteristics on the thermally expandable sheet (for example, see Unexamined Japanese Patent Application Kokai Publication No. S64-28660). In Unexamined Japanese Patent Application Kokai Publication No. S64-28660, the thermally expandable microspheres of the coating layer are caused to expand by selectively heating an image portion by irradiating the image portion with light.

In Unexamined Japanese Patent Application Kokai Publication No. S64-28660, due to heating of the thermally expandable microspheres by heat generated from the image-forming material, the thermally expandable microspheres of a coating layer in the vicinity of the image are also heated when the heat is conducted by portions in the vicinity of the image. Due to rising also in the coating layer in the vicinity of the image, the edge portions of the three-dimensional image (convexity) become dulled (hemming).

In consideration of the aforementioned circumstances, an objective of the present disclosure is to provide a production method of a shaped object and an expansion device capable of producing a shaped object in which dulling of the edge portions of the unevenness is suppressed.

SUMMARY

In order to achieve the aforementioned objective, a method of producing a shaped object according to a first aspect includes:

preparing a formation sheet that includes a base and a thermally expansive layer that is laminated on a first main surface of the base, the thermally expansive layer containing a binder and a thermal expansion material;

laminating, onto a second main surface on a side opposite to the first main surface of the base or onto the thermally expansive layer, a thermal conversion layer in predetermined pattern, the thermal conversion layer converting first electromagnetic waves into heat; and causing the thermally expansive layer to expand in a pattern that corresponds to the predetermined pattern by irradiating the formation sheet on which the thermal conversion layer is laminated with the first electromagnetic waves and second electromagnetic waves that cause the binder to become cross-linked.

In order to achieve the aforementioned objective, an expansion device according to a second aspect for causing expansion of a formation sheet including (i) a base having a first main surface and a second main surface that is on a side opposite to the first main surface and (ii) a thermally expansive layer laminated on the first main surface and containing a binder and a thermal expansion material, the formation sheet having a thermal conversion layer for converting first electromagnetic waves into heat laminated on the second surface or laminated on the thermally expansive layer, the expansion device, includes:

an emitter that irradiates the formation sheet with the first electromagnetic waves and second electromagnetic waves that cause the binder to become cross-linked.

BRIEF DESCRIPTION OF THE DRAWINGS

A more complete understanding of this application can be obtained when the following detailed description is considered in conjunction with the following drawings, in which:

FIG. 12 is a flowchart illustrating a method of producing the shaped object according to Embodiment 2 of the present disclosure;

FIG. 13 is a schematic diagram illustrating a cross-section of the formation sheet laminated with a thermal conversion layer according to Embodiment 2 of the present disclosure;

DETAILED DESCRIPTION

A method of producing a shaped object according to the embodiments of the present disclosure is described below with reference to the drawings.

Embodiment 1

In the present embodiment, a shaped object 100 is produced from a formation sheet 10. The shaped object 100 is used as a decorative sheet, wallpaper, or the like. In the present disclosure, the term "shaped object" refers to a sheet that includes unevennesses shaped (formed) on a predetermined surface, and the unevennesses form geometrical shapes, characters, patterns, decorations, or the like. The term "decorations" refers to objects that appeal to the aesthetic sense through visual and/or tactile sensation. The term "shaped (or formed)" refers to the forming of a shaped object, and is to be construed to also include concepts such as decoration and ornamentation by forming decorations. Moreover, although the shaped object 100 of the present embodiment is a three-dimensional object that includes unevennesses on a predetermined surface, to distinguish this three-dimensional object from three-dimensional objects formed using a so-called 3D printer, the shaped object 100 of the present embodiment is called a 2.5-dimensional (2.5D) object or a pseudo-three-dimensional (pseudo-3D) object. The technique used to produce the shaped object 100 of the present embodiment is called 2.5D printing or pseudo-3D printing.

Formation Sheet

Figure 1:
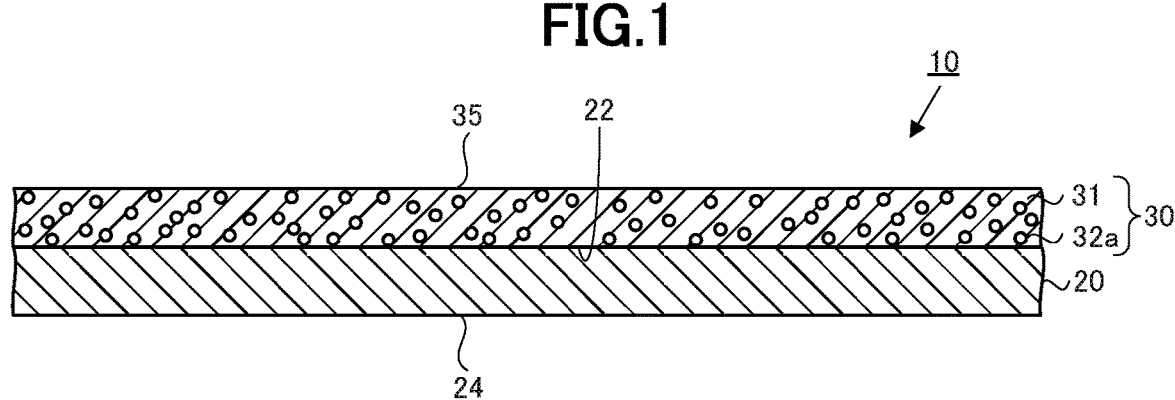
FIG. 1 is a schematic diagram illustrating a cross-section of a formation sheet according to Embodiment 1 of the present disclosure.

First, the formation sheet 10 is described with reference to FIG. 1. As illustrated in FIG. 1, the formation sheet 10 is provided with a base 20 and a thermally expansive layer 30 laminated on a first main surface 22 of the base 20. In the present embodiment, the thermally expansive layer 30 is laminated onto the entire surface of the first main surface 22.

The base 20 of the formation sheet 10 has the first main surface 22 onto which the thermally expansive layer 30 is laminated and a second main surface 24 on the side opposite to the first main surface 22. The base 20 supports the thermally expansive layer 30. The base 20 is formed, for example, in a sheet-like shape. Examples of the material of the base 20 include thermoplastic resins such as polyolefin-type resins (polyethylene (PE), polypropylene (PP), or the like) and polyester-type resins (polyethylene terephthalate (PET), polybutylene terephthalate (PBT), or the like). The type of material of the base 20 and the thickness of the base 20 are selected in accordance with the intended application of the shaped object 100.

The thermally expansive layer 30 of the formation sheet 10 is laminated onto the first main surface 22 of the base 20. The thermally expansive layer 30 contains a binder 31, a thermal expansion material (that is, undistended thermal expansion material) 32a dispersed in the binder 31, and a non-illustrated polymerization initiator.

Any thermoplastic resin, such as a vinyl acetate-type polymer or an acrylic-type polymer, may be used as the binder 31. The binder 31 is cross-linked by irradiating with second electromagnetic waves described further below.

The thermal expansion material 32a expands as a result of being heated to a predetermined temperature or higher (80° C. to 120° C. or higher, for example), and expands in size in accordance with the heat amount heated with (specifically, the heating temperature, the heating time, and the like). In one example, the thermal expansion material 32a is implemented as thermally expandable microcapsules. The thermally expandable microcapsules are microcapsules that encapsulate a foaming agent including propane, butane, or another low boiling point substance in shells made from a thermoplastic resin. The shells of the thermally expandable microcapsules are formed from a thermoplastic resin such as, for example, polystyrene, polyvinyl chloride, polyvinylidene chloride, polyvinyl acetate, polyacrylic acid ester, polyacrylonitrile, polybutadiene, and copolymers thereof. When the thermally expandable microcapsules are heated to the predetermined temperature or higher, the shells soften, the foaming agent vaporizes, and the pressure resulting from the vaporization of the foaming agent causes the shells to expand in a balloon-like manner. The thermally expandable microcapsules expand to a size about five-times larger than that prior to expansion. The average particle size of the thermally expandable microcapsules prior to expansion is about 5 to 50 μm, for example.

The polymerization initiator irradiated with the second electromagnetic waves causes the binder 31 to become cross-linked. The polymerization initiator is, for example, a photo-radical polymerization initiator (benzophenone-type compound, acetophenone-type compound, and benzoin ether-type compound, or the like) that generates radicals when irradiated with ultraviolet light. The polymerization initiator in an amount from 0.1% to 5.0% by weight with respect to the binder 31 is added.

The thermally expansive layer 30 of the formation sheet 10 expands resulting from expansion of the thermal expansion material 32a, thereby forming on a surface 35 on the side opposite to the base 20, an unevenness 110 that is described further below.

Shaped Object

Figure 2:
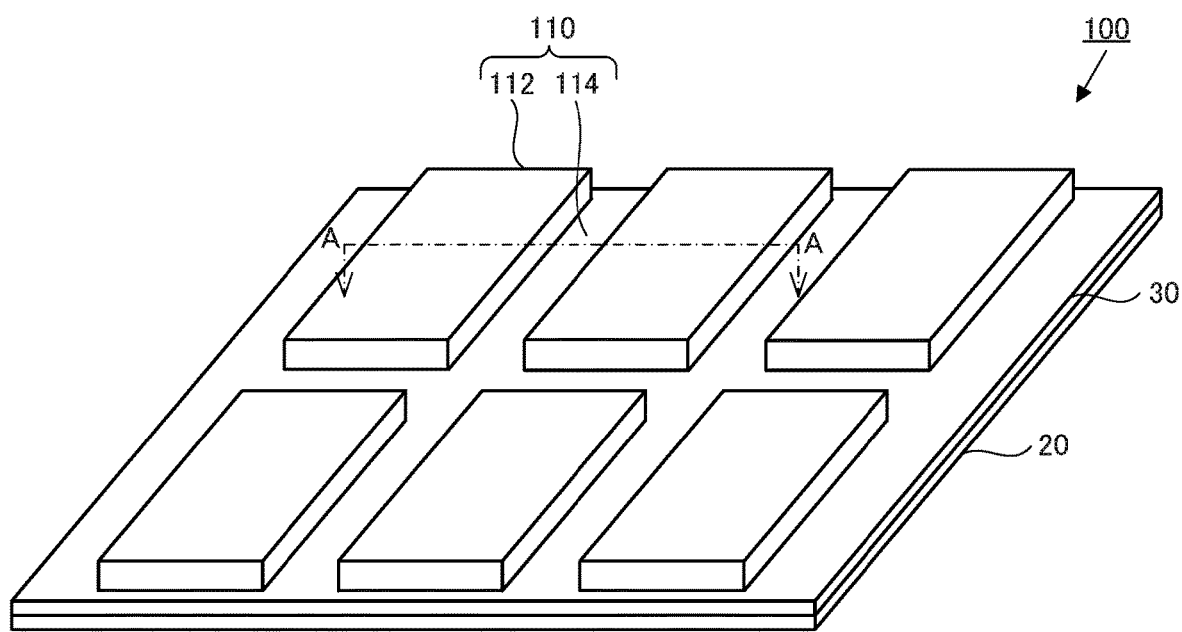
FIG. 2 is a perspective view of a shaped object according to Embodiment 1 of the present disclosure.
Figure 3:
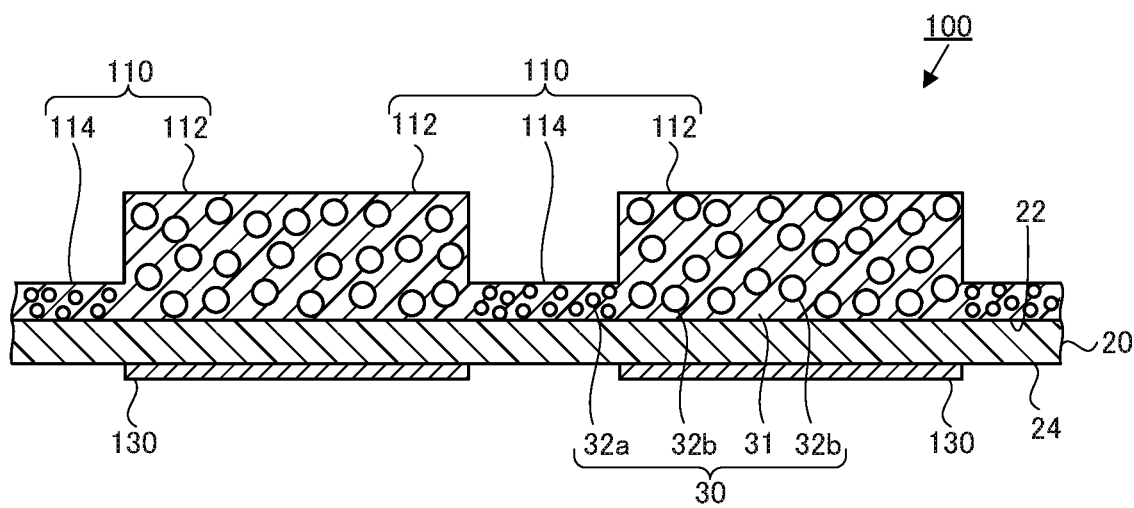
FIG. 3 is a cross-sectional view showing the shaped object illustrated in FIG. 2 taken along line A-A.

Next, the shaped object 100 is described with reference to FIG. 2 and FIG. 3. As illustrated in FIG. 2 and FIG. 3, the shaped object 100 includes the base 20, the thermally expansive layer 30 laminated onto the first main surface 22 of the base 20 and having the unevenness 110 on the side opposite to the base 20, and the thermal conversion layer 130 laminated on the second main surface 24 of the base 20.

The shaped object 100 is a sheet-like shaped object. The shaped object 100 has the unevenness 110 on the surface thereof. Since the configuration of the base 20 of the shaped object 100 is similar to the base 20 of the formation sheet 10, here, the thermally expansive layer 30 and the thermal conversion layer 130 of the shaped object 100 are described.

The thermally expansive layer 30 of the shaped object 100, as illustrated in FIG. 3, includes the binder 31, the thermal expansive material (that is, undistended thermal expansion material) 32a, and distended thermal expansion material 32b. Aside from the fact that a portion of the binder 31 of the thermally expansive layer of the shaped object 100 is cross-linked, the binder 31 of the thermally expansive layer 30 of the shaped object 100 is the same as the binder 31 of the thermally expansive layer 30 of the formation sheet 10. Also, the thermal expansion material 32a of the thermally expansive layer 30 of the shaped object 100 is similar to the thermal expansion material 32a of the formation sheet 10. The distended thermal expansion material 32b is thermal expansion material that became distended when the thermal expansion material 32a was heated at a predetermined temperature or higher. The unevenness 110 of the thermally expansive layer 30 includes a convexity 112 that contains the distended thermal expansion material 32b and a concavity 114 that contains the undistended thermal expansion material 32a.

The thermal conversion layer 130 of the shaped object 100 is provided in order to form the unevenness 110. The thermal conversion layer 130 is laminated onto the second main surface 24 of the base 20 in a pattern corresponding to the unevenness 110 of the thermally expansive layer 30.

The thermal conversion layer 130 irradiated with the first electromagnetic waves converts the first electromagnetic waves into heat and releases the converted heat. Such operation heats the thermally expansive layer 30 of the formation sheet 10 to the predetermined temperature. The temperature to which the thermal expansion material 32a is heated can be controlled by the saturation (that is, the density or concentration of the thermal conversion material) of thermal conversion layer 130 that includes the thermal conversion material which is described further below or the amount of energy per unit surface unit and per unit time that the thermal conversion layer 130 is irradiated with electromagnetic waves. Due to conversion of the first electromagnetic waves by a thermal conversion layer 130 to heat being performed more rapidly than at other portions of the formation sheet 10, the thermally expansive layer 30 in the vicinity of the thermal conversion layer 130 is selectively heated. Here, the first electromagnetic waves are, for example, visible light or infrared light.

The thermal conversion layer 130 includes thermal conversion material that converts the absorbed first electromagnetic waves into heat. Examples of the thermal conversion material include carbon black, metal hexaboride compounds, and tungsten oxide compounds. Carbon black, for example, absorbs visible light and infrared light and converts these types of light into heat. Also, metal hexaboride compounds and tungsten oxide compounds absorb infrared light (near-infrared light) and convert this type of light into heat. Among the metal hexaboride compounds and the tungsten oxide compounds, lanthanum hexaboride ($LaB_6$) and cesium tungsten oxide are preferable from the perspectives of obtaining high light absorptivity in the near-infrared region and high transmittance in the visible light spectrum.

Method of Producing the Shaped Object

Next, the method of producing the shaped object 100 is described with reference to FIG. 4 to FIG. 9. In the present embodiment, the shaped object 100 is produced from the formation sheet 10 which is sheet-like (for example, A4 sheet size).

Figure 4:
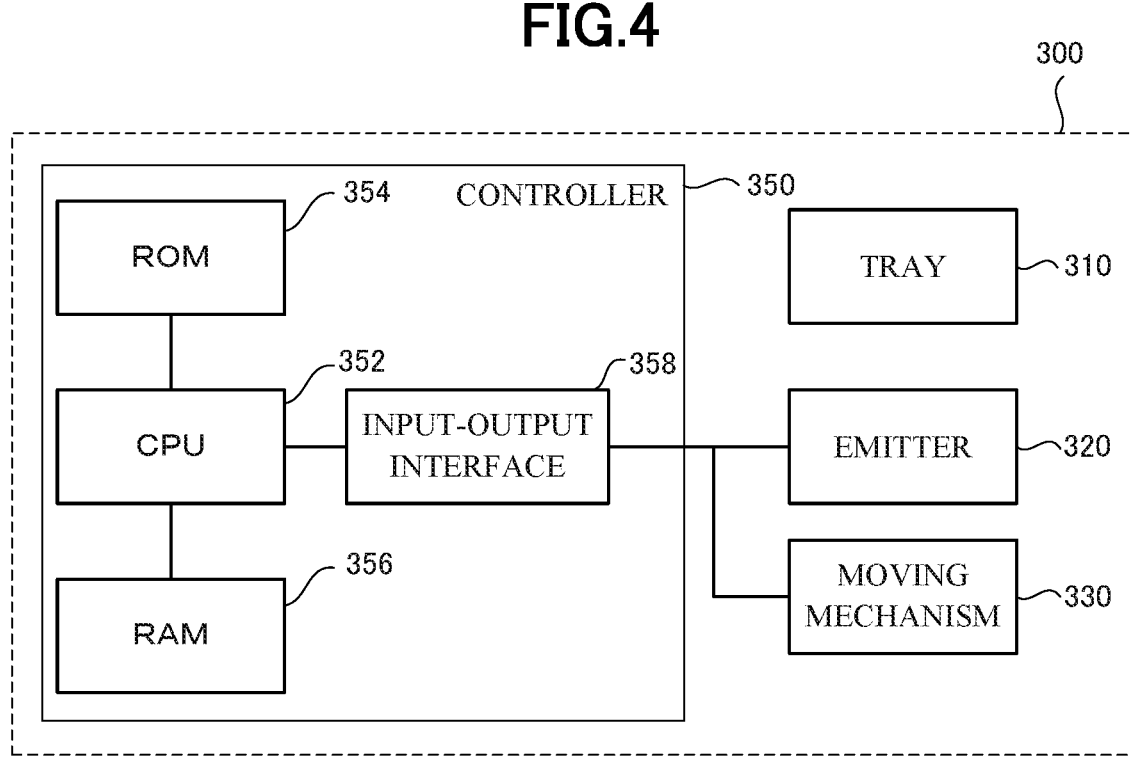
FIG. 4 is a diagram illustrating a configuration of hardware of an expansion device according to Embodiment 1 of the present disclosure.
Figure 5:
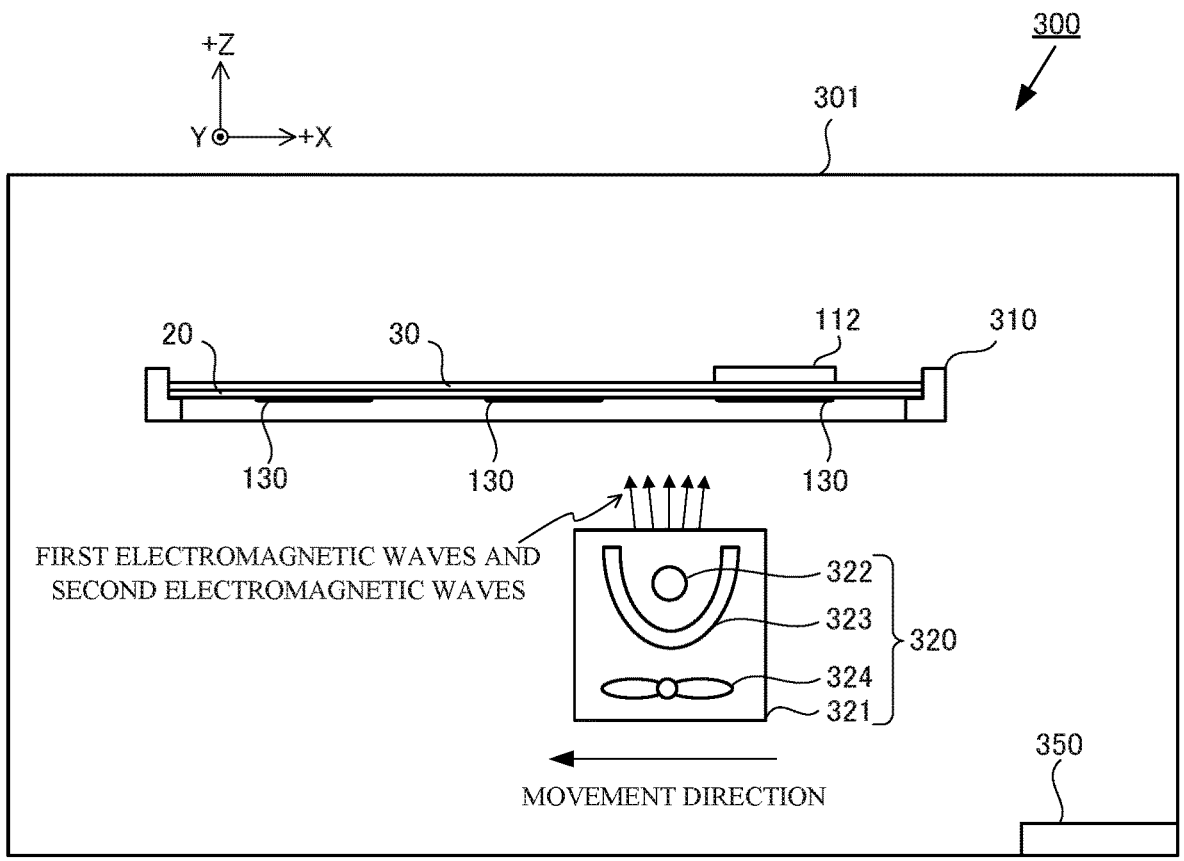
FIG. 5 is a schematic diagram illustrating the expansion device according to Embodiment 1 of the present disclosure.

First, an expansion device 300 that is to be used for the method of producing the shaped object 100 is described. As illustrated in FIG. 4 and FIG. 5, the expansion device 300 includes, in a housing 301, a tray 310 on which the formation sheet 10 laminated with the thermal conversion layer 130 is mounted, an emitter 320 that irradiates the formation sheet 10 laminated with the thermal conversion layer 130 with the first electromagnetic waves and the second electromagnetic waves, a moving mechanism 330 that moves the emitter 320, and a controller 350. For ease of understanding in the present detailed description, in FIG. 5, the length-wise rightward direction (rightward direction on the page) of the expansion device 300 is described as the +X-direction, the upward direction (upward direction on the page) is described as the +Z-direction, and the direction perpendicular to the +X-direction and the +Z-direction is described as the +Y-direction (out the front of the page). Also, in FIG. 5, the moving mechanism 330 is omitted.

The tray 310 of the expansion device 300 is used for placement of the formation sheet 10 laminated with the thermal conversion layer 130 at a predetermined position in the expansion device 300. Examples of the tray 310 include a frame-like tray that retains the outer edge portions of the formation sheet 10. The formation sheet 10 on which the thermal conversion layer 130 is laminated is retained by the tray 310 such that the thermal conversion layer 130 faces the −Z-direction.

The emitter 320 of the expansion device 300 irradiates the formation sheet 10 onto which the thermal conversion layer 130 is laminated with the first electromagnetic waves and the second electromagnetic waves. The heat released from the thermal conversion layer 130 causes expansion of the thermally expansive layer 30 in a pattern corresponding to the thermally conversion 130 and causes cross-linking of the binder 31 of the thermally expansive layer 30. Here, the first electromagnetic waves are electromagnetic waves (visible light and infrared light, for example) that are absorbed and converted to heat by the thermal conversion material (lanthanum hexaboride, for example) included in the thermal conversion layer 130. Also, the second electromagnetic waves are electromagnetic waves (ultraviolet light, for example) that cause the binder 31 to become cross-linked. The expansion of the thermally expansive layer 30 and the cross-linking of the binder 31 are described further below.

In the present embodiment, the emitter 320 irradiates the formation sheet 10 onto which the thermal conversion layer 130 is laminated with the first electromagnetic waves and the second electromagnetic waves from the −Z-side, which is the side where the thermal conversion layer 130 is laminated, while moving in the −X direction from the +X-side by the moving mechanism 330.

The emitter 320 is equipped with a covering 321, a lamp 322, a reflection plate 323, and a fan 324. The covering 321 houses the lamp 322, the reflection plate 323, and the fan 324. Examples of the lamp 322 include a xenon lamp. The lamp 322 irradiates the formation sheet 10 onto which the thermal conversion layer 130 is laminated with electromagnetic waves including near-infrared light (wavelength: 750 nm to 1400 nm) as the first electromagnetic waves and ultraviolet light (wavelength: 200 nm to 400 nm) as the second electromagnetic waves. The reflection plate 323 reflects the electromagnetic waves emitted from the lamp 322 toward the thermal conversion layer 130. The fan 324 blows air into the covering 321 cooling the lamp 322 and the reflection plate 323.

The moving mechanism 330 of the expansion device 300 moves the emitter 320 in the +X-direction and in the −X-direction. The moving mechanism 330 is equipped with, for example, a stepping motor that causes the emitter 320 to move and conveyance rails to which the emitter 320 is attachable, both of which are non-illustrated.

The controller 350 of the expansion device 300 controls the emitter 320 and the moving mechanism 330. The controller 350 is equipped with a central processing unit (CPU) 352 that executes various types of processing, a read-only memory (ROM) 354 having stored therein programs and data, a random access memory (RAM) 356 for storing data, and an input-output interface 358 that inputs signals and outputs signals between individual components. The functions of the controller 350 are achieved by the CPU 352 executing the programs stored in the ROM 354. The input-output interface 358 inputs signals and outputs signals between the CPU 352, the emitter 320, and the moving mechanism 330.

Figure 6:
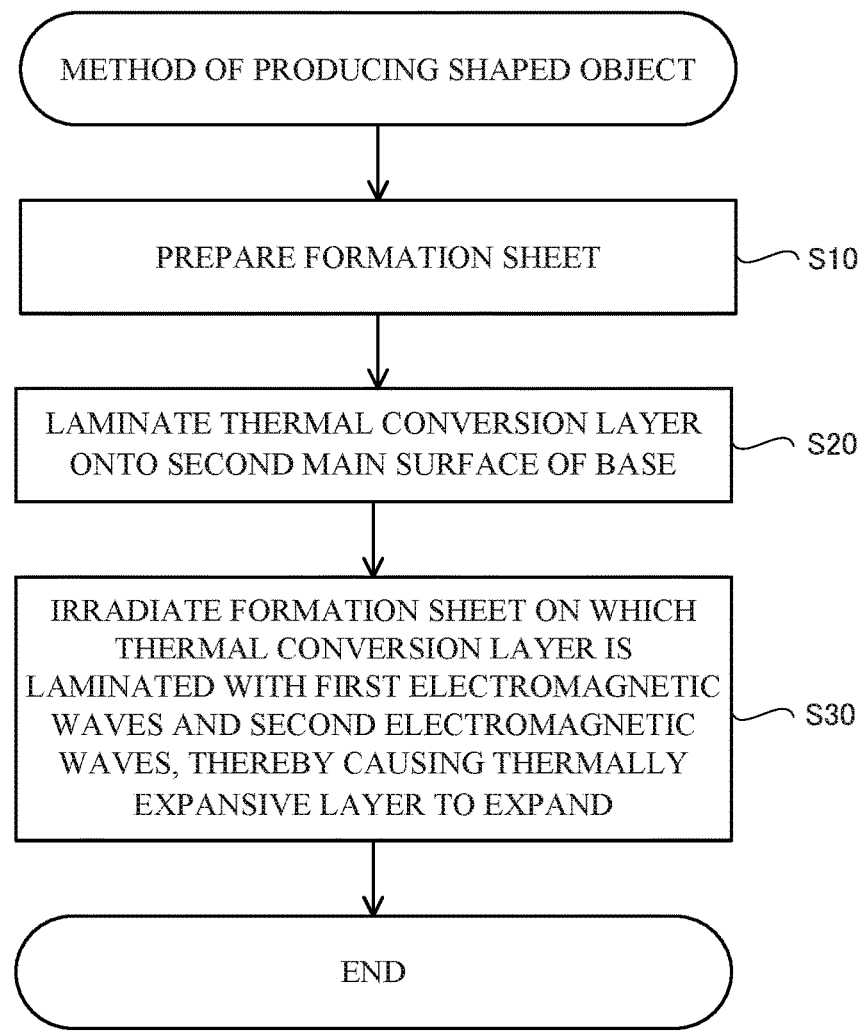
FIG. 6 is a flowchart illustrating a method of producing the shaped object according to Embodiment 1 of the present disclosure.

Next, the method of producing the shaped object 100 is described. FIG. 6 is a flowchart illustrating the method of producing the shaped object 100. The method of producing the shaped object 100 includes a preparation step of preparing the formation sheet 10 (step S10), a thermal conversion layer lamination step of laminating onto the second main surface 24 of the base 20 of the formation sheet 10 the thermal conversion layer 130, for conversion of the first electromagnetic waves into heat, in a pattern corresponding to the unevenness 110 (step S20), and an expansion step of causing the thermally expansive layer 30 to expand in the pattern of the unevenness 110 by irradiating the formation sheet 10 on which the thermal conversion layer 130 is laminated with the first electromagnetic waves and the second electromagnetic waves (step S30).

In the preparation step (step S10), the formation sheet 10 and the ink containing the thermal conversion material are prepared. The formation sheet 10 is produced by screen printing, onto the first main surface 22 of the base 20, a coating liquid formed by mixing together the binder 31, the thermal expansion material 32a, and the photo-radical polymerization initiator that generates radicals due to the emission of ultraviolet light, and then drying the printed coating liquid. Examples of the ink containing the thermal conversion material include ink containing lanthanum hexaboride.

Figure 7:
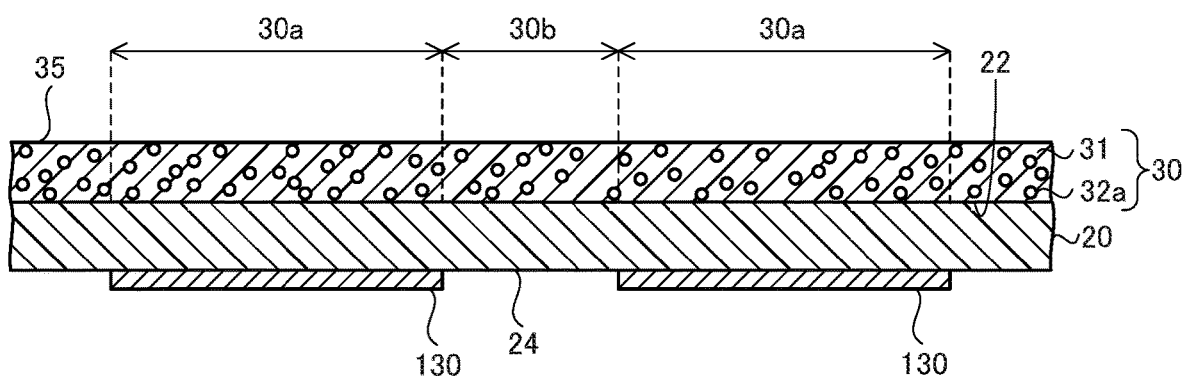
FIG. 7 is a schematic diagram illustrating a cross-section of the formation sheet laminated with a thermal conversion layer according to Embodiment 1 of the present disclosure.

In the thermal conversion layer lamination step (step S20), the ink containing the thermal conversion material is printed on the second main surface 24 of the base 20 by the printing device in a saturation pattern (that is, a pattern corresponding to the unevenness 110) in accordance with the height of the convexity 112 of the unevenness 110. In doing so, the thermal conversion layer 130, as illustrated in FIG. 7, is laminated onto the second main surface 24 of the base 20. Examples of the printing device include inkjet printers.

Referring back to FIG. 6, in the expansion step (step S30), the formation sheet 10 on which the thermal conversion layer 130 is laminated is irradiated with near-infrared light (that is, the first electromagnetic waves) and ultraviolet light (that is, the second electromagnetic waves) by the expansion device 300 from the side where the thermal conversion layer 130 is laminated. In doing so, the thermal conversion layer 130 converts the near-infrared light into heat and then releases the converted heat.

Figure 8:
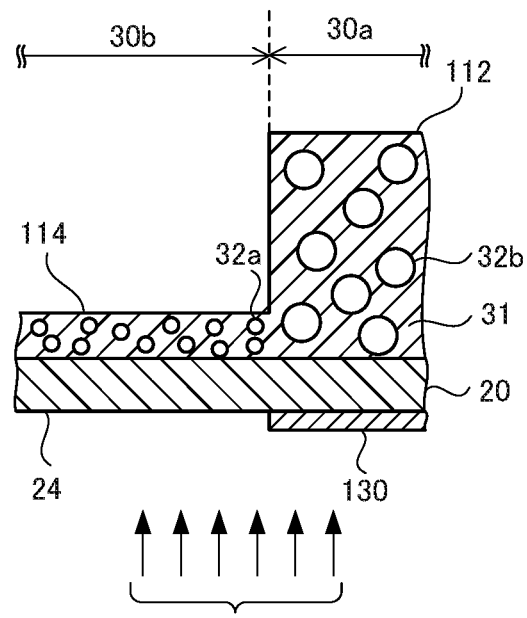
FIG. 8 is a schematic diagram illustrating a cross-section of the shaped object according to Embodiment 1 of the present disclosure.

At a first portion 30a that corresponds to the convexity 112 of the thermally expansive layer 30, the thermal expansion material 32a is heated to a predetermined temperature or higher thereby forming the distended thermal expansion material 32b since the thermal conversion layer 130 is formed on the second main surface 24 of the base 20 in a saturation pattern in accordance with the height of the convexity 112. Moreover, since the lanthanum hexaboride included in the thermal conversion layer 130 absorbs no less than 60% of the ultraviolet light (no greater than 40% transmittance of ultraviolet light), at the first portions 30a that correspond to the convexity 112 of the thermally expansive layer 30, the photo-radical polymerization initiator generates almost no radicals, and thus cross-linking of the binder 31 is minimal. Therefore, as illustrated in FIG. 8, the first portion 30a that corresponds to the convexity 112 of the thermally expansive layer 30 expands, thereby forming the convexity 112.

Figure 9:
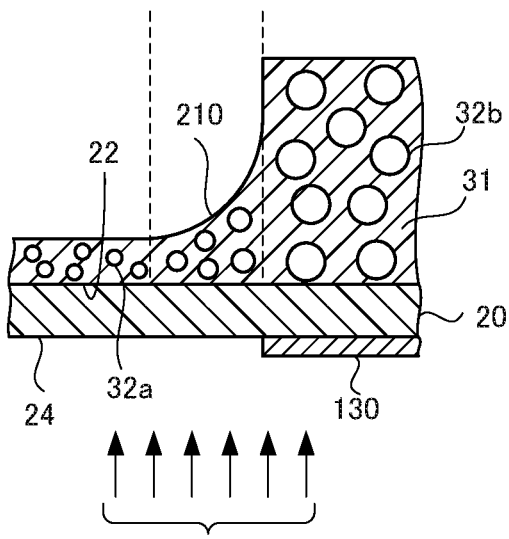
FIG. 9 is a schematic diagram illustrating a cross-section of a shaped object according to a comparison example.

Conversely, at a second portion 30b that corresponds to the concavity 114 of the thermally expansive layer 30, since the thermal conversion layer 130 is formed on the base 20 in a saturation pattern corresponding to the height of the convexity 112, the ultraviolet light does not get absorbed by the thermal conversion layer 130, and thus the photo-radical polymerization initiator generates radicals. In doing so, the binder 31 becomes cross-linked at the second portion 30b that corresponds to the concavity 114 of the thermally expansive layer 30. Since the binder 31 becomes cross-linked, expansion of the thermal expansion material 32a of the second portion 30b can be hindered even when the heat, resulting from the thermal expansion material 32a being heated to the predetermined temperature or higher, transfers from the thermal conversion layer 130 or the first portion 30a to the second portion 30b. Therefore, the expansion of the second portion 30b is suppressed. As a result, dulling of edge portions of the unevenness 110 can be suppressed. For example, dulling 210 of the edge portions of the unevenness as illustrated in FIG. 9 caused when a formation sheet including a thermally expansive layer containing binder 31 and thermal expansion material 32a yet not containing any polymerization initiator is irradiated with only the first electromagnetic waves can be suppressed. The above processing enables production of the shaped object 100.

As described above, in the present embodiment, the formation sheet 10 on which the thermal conversion layer 130 is laminated is irradiated with the first electromagnetic waves and the second electromagnetic waves thereby causing the thermally expansive layer 30 to distend. As such, expansion of the second portion 30b that corresponds to the concavity 114 of the thermally expansive layer 30 can be suppressed. Therefore, the shaped object 100 in which dulling of the edge portions of the unevenness 110 is suppressed can be produced. Moreover, in the present embodiment, since the thermal conversion layer 130 is laminated onto the second main surface 24 of the base 20, color printing can be easily performed on the thermally expansive layer 30 without any concern for the color of the thermal conversion layer 130. For example, a color ink layer representing a color image and including four ink colors of cyan, magenta, yellow, and black may be laminated onto the thermally expansive layer 30. Furthermore, since the binder 31 of the thermally expansive layer 30 is cross-linked, the heat resistance of the produced shaped object 100 can be enhanced. Since the emitter 320 of the expansion device 300 irradiates the formation sheet 10 on which the thermal conversion layer 130 is laminated with the first electromagnetic waves and the second electromagnetic waves, the expansion device 300 can cause the formation sheet 10 to expand while suppressing dulling of the edge portions.

Embodiment 2

In Embodiment 1, although the thermal conversion layer 130 is laminated on the second main surface 24 of the base 20, the thermal conversion layer 130 may be laminated onto the thermally expansive layer 30.

Since the formation sheet 10 and the expansion device 300 of the present embodiment are similar to those in Embodiment 1, the shaped object 100 and the method of producing the shaped object 100 are described.

Figure 10:
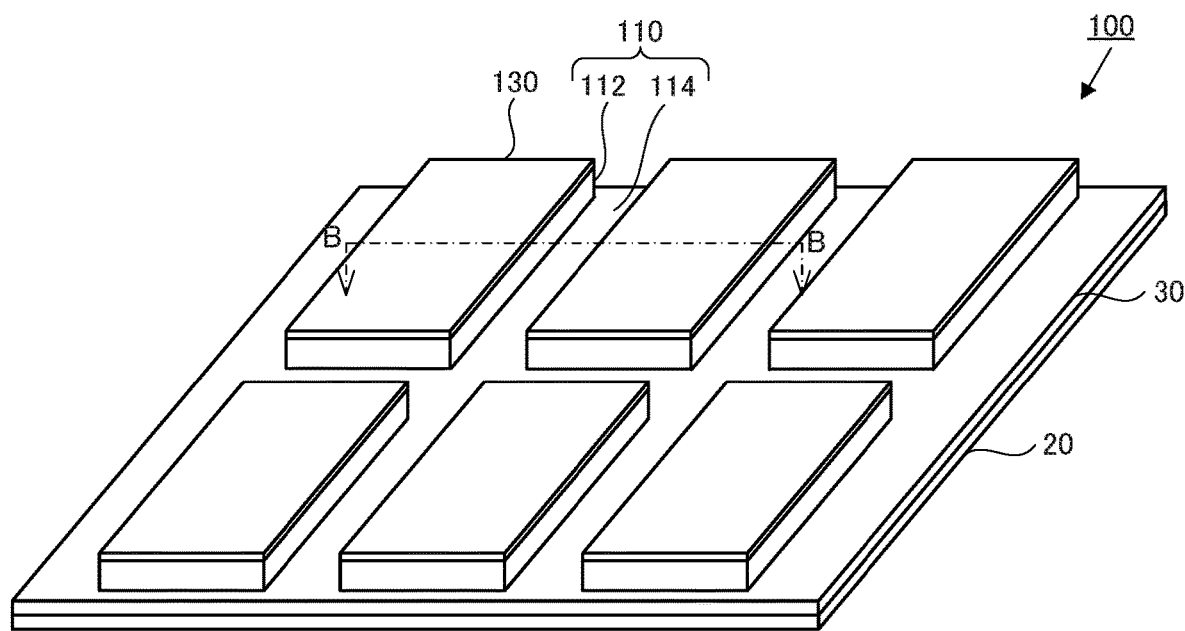
FIG. 10 is a perspective view of a shaped object according to Embodiment 2 of the present disclosure.
Figure 11:
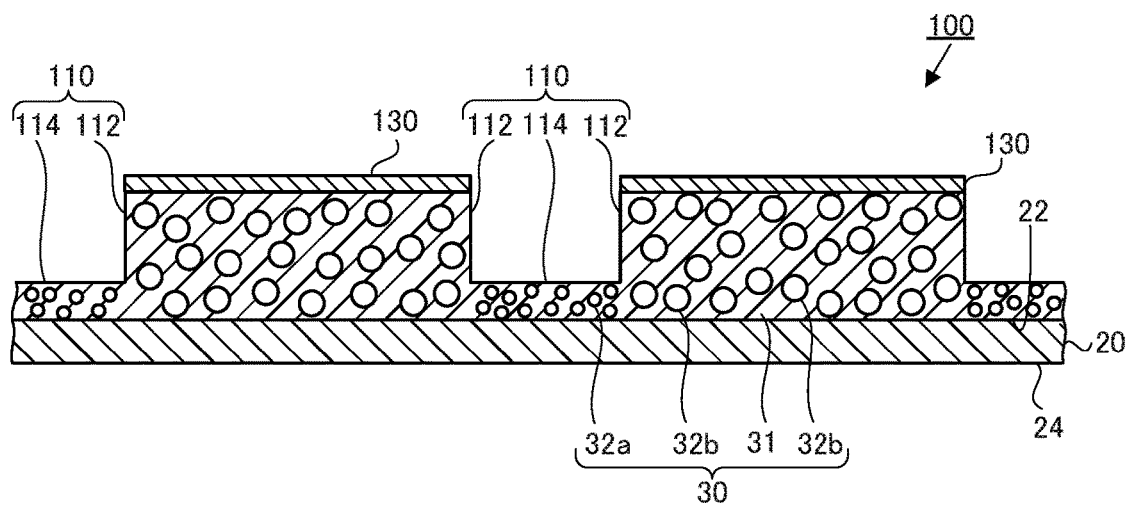
FIG. 11 is a cross-sectional view showing the shaped object illustrated in FIG. 10 taken along line B-B.

The shaped object 100 of the present embodiment, as illustrated in FIG. 10, includes the base 20, the thermally expansive layer 30 that is laminated on the first main surface 22 of the base 20 and has the unevenness 110 on the side opposite to the base 20, and the thermal conversion layer 130 that is laminated on the thermally expansive layer 30.

The shaped object 100 of the present embodiment, similar to the shaped object 100 of Embodiment 1, is a sheet-like shaped object. Also, the shaped object 100 of the present embodiment has the unevenness 110 on a surface. The unevenness 110, similar to that in Embodiment 1, has the convexity 112 and the concavity 114. Since the configuration of the base 20 and the thermally expansive layer 30 of the shaped object 100 of the present embodiment is similar to the base 20 and the thermally expansive layer 30 of the shaped object 100 of Embodiment 1, the thermal conversion layer 130 is described.

The thermal conversion layer 130 of the shaped object 100 is provided on the convexity 112 of the thermally expansive layer 30. In order to form the unevenness 110, the thermal conversion layer 130 is laminated onto the thermally expansive layer 30 of the formation sheet 10 in a pattern corresponding to the unevenness 110. The thermal conversion layer 130, similar to that in Embodiment 1, includes thermal conversion material that converts the absorbed first electromagnetic waves into heat.

Next, the method of producing the shaped object 100 of the present embodiment is described. FIG. 12 is a flowchart illustrating the method of producing the shaped object 100 of the present embodiment. The method of producing the shaped object 100 includes the preparation step of preparing the formation sheet 10 (step S10), the thermal conversion layer lamination step of laminating onto the thermally expansive layer 30 of the formation sheet 10, the thermal conversion layer 130, for conversion of the first electromagnetic waves into heat, in a pattern corresponding to the unevenness 110 (step S25), and the expansion step of causing the thermally expansive layer 30 to expand in the pattern of the unevenness 110 by irradiating the formation sheet 10 on which the thermal conversion layer 130 is laminated with the first electromagnetic waves and the second electromagnetic waves (step S30). Since the preparation step (step S10) of the present embodiment is similar to that in Embodiment 1, the thermal conversion layer lamination step (step S25) and the expansion step (step S30) are described.

In the thermal conversion layer lamination step (step S25), the ink containing the thermal conversion material is printed onto the thermally expansive layer 30 of the formation sheet 10 by the printing device in the saturation pattern (the pattern corresponding to the unevenness 110) in accordance with the height of the convexity 112 of the unevenness 110. In doing so, the thermal conversion layer 130, as illustrated in FIG. 13, is laminated onto the thermally expansive layer 30. Examples of the printing device include inkjet printers.

Figure 14:
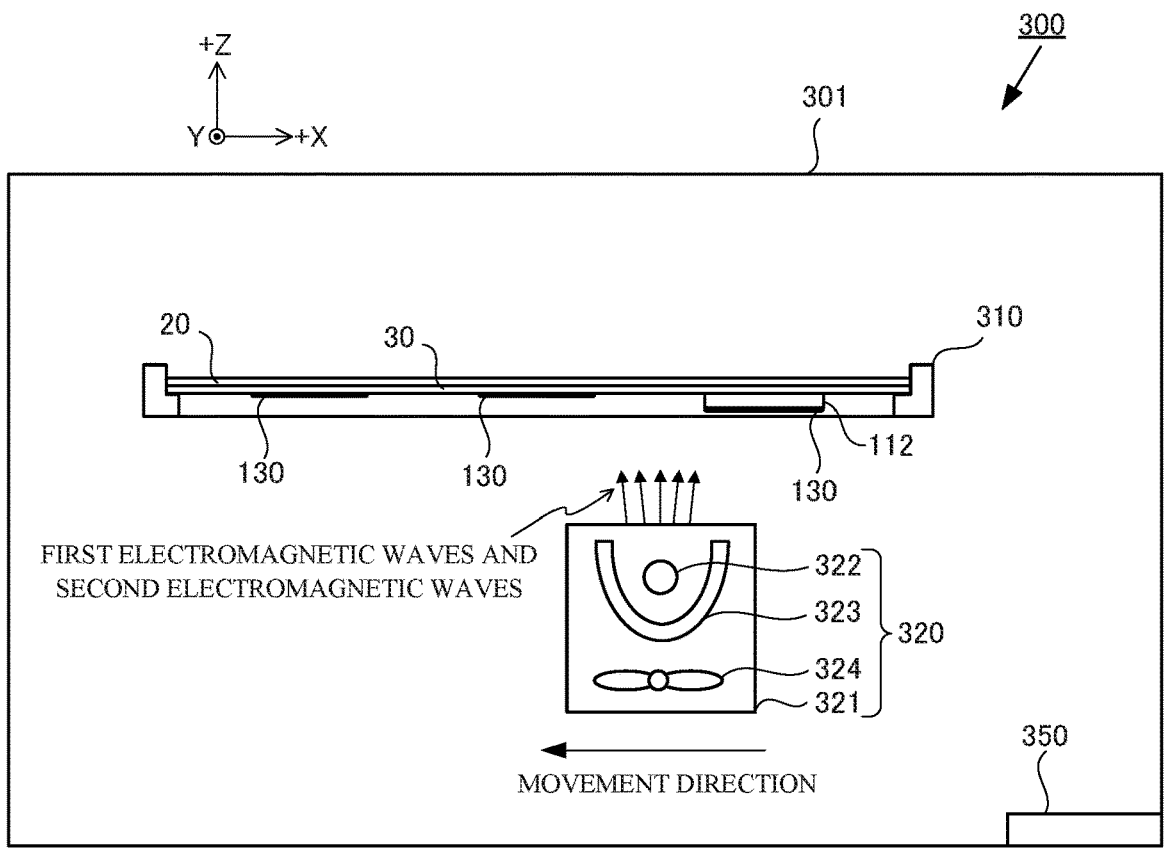
FIG. 14 is a schematic diagram illustrating an expansion step according to Embodiment 2 of the present disclosure.
Figure 15:
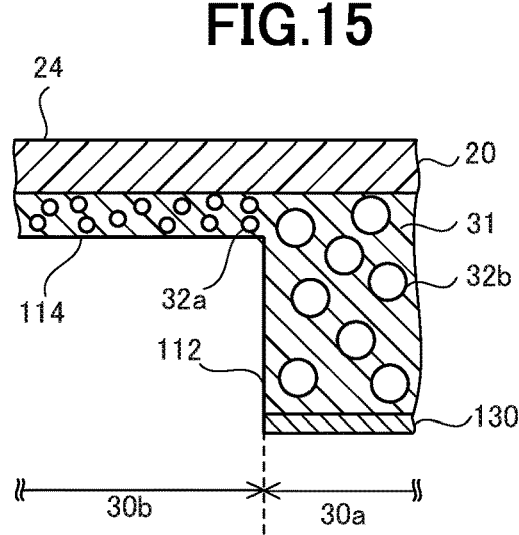
FIG. 15 is a schematic diagram illustrating a cross-section of the shaped object according to Embodiment 2 of the present disclosure.

Referring back to FIG. 12, in the expansion step (step S30), the formation sheet 10 on which the thermal conversion layer 130 is laminated is set onto the tray 310 of the expansion device 300 such that the thermal conversion layer 130 faces the −Z direction. Then, as illustrated in FIG. 14 and FIG. 15, the formation sheet 10 on which the thermal conversion layer 130 is laminated is irradiated with near-infrared light (that is, the first electromagnetic waves) and ultraviolet light (that is, the second electromagnetic waves) by the expansion device 300 from the side where the thermal conversion layer 130 is laminated, thereby causing the thermally expansive layer 30 to distend in the pattern of the unevenness 110. The above processing enables production of the shaped object 100.

Similar to that in Embodiment 1, at the first portion 30a that corresponds to the convexity 112 of the thermally expansive layer 30 in the present embodiment, the thermal expansion material 32a is heated to the predetermined temperature or higher forming the distended thermal expansion material 32b, and cross-linking of the binder 31 is minimal. Therefore, the first portion 30a that corresponds to convexity 112 of the thermally expansive layer 30 expands, thereby forming the convexity 112. Also, at the second portion 30b that corresponds to the concavity 114 of the thermally expansive layer 30, the photo-radical polymerization initiator generates radicals, thereby causing the binder 31 to become cross-linked. In doing so, expansion of the second portion 30b can be suppressed and dulling of the edge portions of the unevenness 110 can be suppressed.

As described above, the formation sheet 10 on which thermal conversion layer 130 is laminated is irradiated with the first electromagnetic waves and the second electromagnetic waves thereby causing the thermally expansive layer 30 to distend. As such, expansion of the second portion 30b that corresponds to the concavity 114 of the thermally expansive layer 30 can be suppressed. Therefore, the shaped object 100 in which dulling of the edge portions of the unevenness 110 is suppressed can be produced. Moreover, in the present embodiment, since the thermal conversion layer 130 is laminated onto the thermally expansive layer 30, the thermally expansive layer 30 (the thermal expansion material 32a) can be heated rapidly regardless of the material of the base 20 (thermal conductivity of the base 20). Furthermore, since the binder 31 of the thermally expansive layer 30 is cross-linked, the heat resistance of the produced shaped object 100 can be enhanced.

MODIFIED EXAMPLE

Although embodiments of the present disclosure are described above, various types of modifications can be made to the present disclosure without departing from the spirit and scope of the present disclosure.

For example, the shaped object 100 may be produced in a roll-like shape from the roll-like shape formation sheet 10.

The material of the base 20 is not limited to thermoplastic resins. The material of the base 20 may be paper, fabric, or the like. The thermoplastic resin of the base 20 is not limited to polyolefin-type resins and polyester-type resins. The thermoplastic resin of the base 20 may be a polyamide-type resin, a polyvinyl chloride (PVC)-type resin, a polyimide-type resin, or the like.

The polymerization initiator included in the thermally expansive layer 30 of the formation sheet 10 is not limited to photo-radical polymerization initiator. The polymerization initiator may be a photo-cationic polymerization initiator, a photo-anionic polymerization initiator, or the like.

Also, the thermally expansive layer 30 of the formation sheet 10 may be without any polymerization initiator. In such a case, at the second portion 30b that corresponds to the concavity 114 of the thermally expansive layer 30 of the formation sheet 10, the radicals are generated in the binder 31 by emission of the second electromagnetic waves. Since the binder 31 is cross-linked by the generated radicals, the shaped object 100 in which dulling of the edge portions of the unevenness 110 is suppressed can be produced.

The thermal conversion layer 130 may be laminated onto a release layer provided on either the second main surface 24 of the base 20 or the thermally expansive layer 30. In doing so, the release layer may be peeled away from the shaped object 100, and the thermal conversion layer 130 can be removed from the shaped object 100.

Another layer of a freely-selected material may be formed between each of the formation sheet 10 and the shaped object 100. For example, an adhesive layer may be formed, between the base 20 and the thermally expansive layer 30, for greater adhesion between the base 20 and the thermally expansive layer 30. Examples of the adhesive layer include surface modifiers.

Moreover, similar to the shaped object 100 of Embodiment 1, the shaped object 100 of Embodiment 2 may be laminated with a color ink layer representing a color image.

The expansion device 300 may be equipped with a conveyance mechanism that conveys the formation sheet 10 on which the thermal conversion layer 130 is laminated instead of being equipped with the tray 310 and the moving mechanism 330. The emitter 320 attached to the thermal expansion device 300 may irradiate the formation sheet 10 on which the thermal conversion layer 130 is laminated with the first electromagnetic waves and the second electromagnetic waves as the expansion device 300 conveys the formation sheet 10 on which the thermal conversion layer 130 is laminated.

Figure 16:
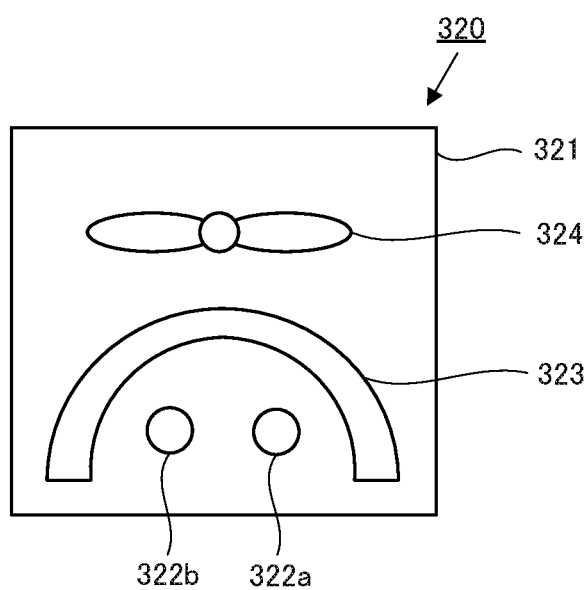
FIG. 16 is a schematic diagram illustrating an emitter of an expansion device according to a modified example of the present disclosure.

The emitter 320 of the expansion device 300 may include multiple light sources. For example, as illustrated in FIG. 16, the emitter 320 may be equipped with an infrared lamp 322a that emits infrared light (the first electromagnetic waves) and an ultraviolet lamp 322b that emits ultraviolet light (the second electromagnetic waves) instead of being equipped with the lamp 322. In such a case, the timing at which the emitter 320 starts emitting the second electromagnetic waves may be offset from the timing at which the emitter 320 starts emitting the first electromagnetic waves and vice versa or the timing at which the emitter 320 stops the second electromagnetic waves may be offset from the timing at which the emitter 320 stops emitting the first electromagnetic waves and vice versa. For example, the emitter 320 may irradiate the formation sheet 10 on which the thermal conversion layer 130 is laminated with the first electromagnetic waves and the second electromagnetic waves by starting irradiation of the formation sheet 10 on which the thermal conversion layer 130 is laminated with the first electromagnetic waves after starting irradiation of the formation sheet 10 on which the thermal conversion layer 130 is laminated with the second electromagnetic waves. Also, the emitter 320 may stop irradiation of the formation sheet 10 on which the thermal conversion layer 130 is laminated with the first electromagnetic waves after stopping irradiation of the formation sheet 10 on which the thermal conversion layer 130 is laminated with the second electromagnetic waves.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A method of producing a shaped object, the method comprising:

receiving a formation sheet comprising a base and a thermally expansive layer laminated on a first main surface of the base, the thermally expansive layer comprising a binder and a thermal expansion material;

laminating, onto a second main surface on a side opposite to the first main surface of the base or onto the thermally expansive layer, a thermal conversion layer in predetermined pattern, the thermal conversion layer being configured to convert first electromagnetic waves into heat and to absorb second electromagnetic waves; and simultaneously irradiating the formation sheet with the first electromagnetic waves and the second electromagnetic waves from a direction in which the thermal conversion layer is intervening between a source or sources of the first electromagnetic waves and the second electromagnetic waves and the formation sheet to cause the thermal conversion layer to convert the first electromagnetic waves into the heat to expand a first portion of the thermal expansion material corresponding to the predetermined pattern and to cause that cause the binder in the first portion of the thermal expansion material to experience less cross-linking than the binder in a second portion of the thermal expansion material not corresponding to the predetermined pattern.

2. The method according to claim 1, wherein the thermally expansive layer comprises a polymerization initiator configured to cause the binder to become cross-linked by emission of the second electromagnetic waves.

3. The method according to claim 2, wherein the thermally expansive layer comprises the polymerization initiator in an amount from 0.1% to 5.0% by weight with respect to the binder.

4. The method according to claim 3, wherein the binder is a thermoplastic resin.

5. The method according to claim 1, wherein the first electromagnetic waves are infrared light and the second electromagnetic waves are ultraviolet light.

6. The method according to claim 1, comprising laminating a color ink layer onto the thermally expansive layer.

7. The method according to claim 1, wherein a wavelength of the first electromagnetic waves is longer than a wavelength of the second electromagnetic waves.

* * * * *

UNITED STATES PATENT AND TRADEMARK OFFICE
CERTIFICATE OF CORRECTION

| | | |
|---|---|---|
| PATENT NO. | : 11,511,533 B2 | Page 1 of 1 |
| APPLICATION NO. | : 16/804222 | |
| DATED | : November 29, 2022 | |
| INVENTOR(S) | : Hideki Takahashi et al. | |

It is certified that error appears in the above-identified patent and that said Letters Patent is hereby corrected as shown below:

In the Claims

Column 12, Claim 1, Lines 17 and 18 should read:
sponding to the predetermined pattern and to cause the binder in the first portion of the thermal Signed and Sealed this
Twenty-second Day of August, 2023

Katherine Kelly Vidal
*Director of the United States Patent and Trademark Office*